United States Patent [19]
Peters

[11] Patent Number: 5,461,319
[45] Date of Patent: Oct. 24, 1995

[54] SYMMETRIC DIFFERENTIAL CAPACITANCE TRANSDUCER EMPLOYING CROSS COUPLED CONDUCTIVE PLATES TO FORM EQUIPOTENTIAL PAIRS

[76] Inventor: Randall D. Peters, 2812 22nd St., Lubbock, Tex. 79401

[21] Appl. No.: 333,862

[22] Filed: Nov. 3, 1994

Related U.S. Application Data

[63] Continuation of Ser. No. 998,077, Dec. 28, 1992, abandoned.

[51] Int. Cl.⁶ .................................................. G01R 27/26
[52] U.S. Cl. ........................... 324/660; 324/661; 324/662; 324/679; 324/680; 340/870.37
[58] Field of Search ...................... 324/658, 660, 324/661, 662, 679, 680, 725; 340/870.37

[56] References Cited

U.S. PATENT DOCUMENTS

| | | | |
|---|---|---|---|
| 3,151,239 | 9/1964 | Lecroart et al. | 235/185 |
| 3,278,919 | 10/1966 | Fleming | 340/200 |
| 3,729,991 | 5/1973 | Hardway, Jr. | 324/660 |
| 3,845,377 | 10/1974 | Shimotori | 340/870.37 |
| 3,944,792 | 3/1976 | Sautner | 324/679 |
| 4,086,528 | 4/1978 | Walton | 324/671 |
| 4,227,182 | 10/1980 | Ogasawara et al. | 340/870.37 |
| 4,243,114 | 1/1981 | Brouwer | 340/870.37 |
| 4,303,919 | 12/1981 | Dimeff | 340/870.37 |
| 4,310,806 | 1/1982 | Ogasawara | 331/40 |
| 4,386,312 | 5/1983 | Briefer | 324/60 |
| 4,389,646 | 6/1983 | Tago | 340/870.37 |
| 4,403,219 | 9/1983 | Jarvinen | 340/870.37 |
| 4,439,725 | 3/1984 | Ogasawara | 324/662 |
| 4,837,500 | 6/1989 | Abringh | 324/679 |
| 5,028,875 | 7/1991 | Peters | 324/660 |
| 5,028,876 | 7/1991 | Cadwell | 324/678 |

OTHER PUBLICATIONS

Randall D. Peters, J. F. Cardenas–Garcia and M. E. Parten J. Micromech. Microeng. 1 month unavailable (1991) 103–112. Printed in UK. Entitled: "Capacitive Servo–Device for Microrobotic Applications".

*Primary Examiner*—Kenneth A. Wieder
*Assistant Examiner*—Christopher M. Tobin

[57] ABSTRACT

A bridge-type capacitance transducer comprising four active components is disclosed. The symmetry of this transducer is maintained in the presence of capacitance change induced by motion. Consequently, there is greater immunity to extraneous stray capacitances, thus greater sensitivity and range of linearity. Sensitivity is further increased by means of synchronous detection at the output.

12 Claims, 9 Drawing Sheets

$$c_1 = \frac{\varepsilon_0 \pi R^2}{2}\left(\frac{1}{d-y}\right) \qquad c_2 = \frac{\varepsilon_0 \pi R^2}{2}\left(\frac{1}{d+y}\right)$$

$$c_3 = c_1 \ \& \ c_4 = c_2$$

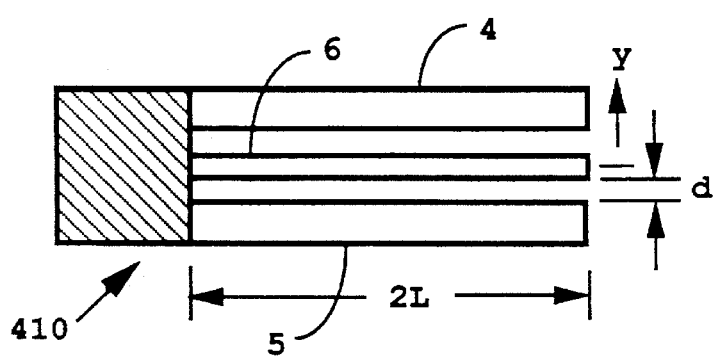
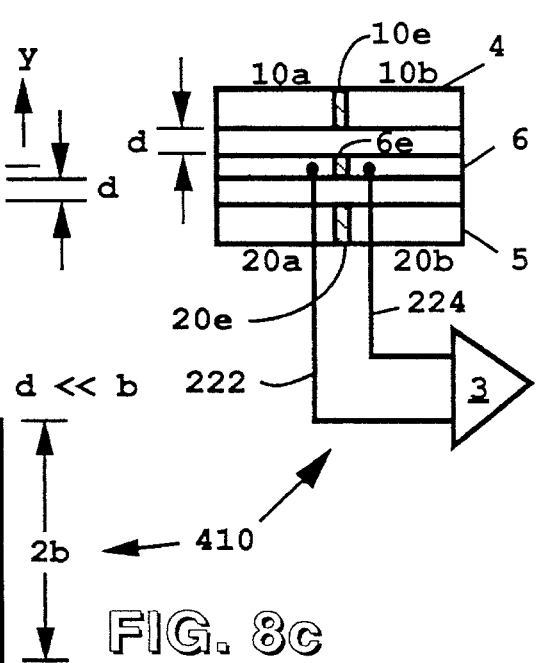
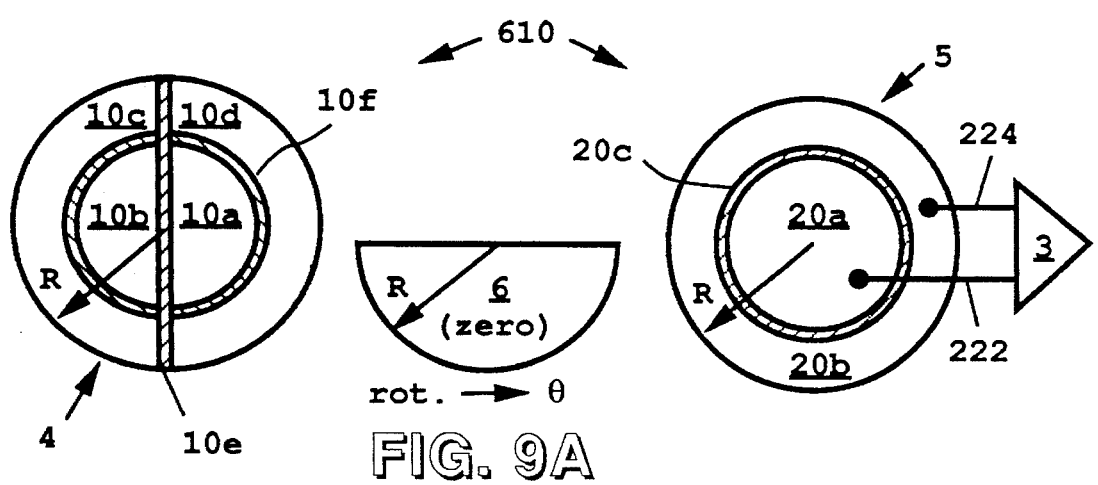
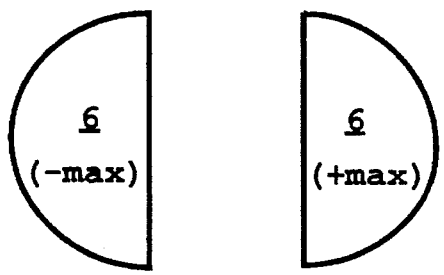

Axis of rotation
of electrode 6

710

SYMMETRIC DIFFERENTIAL CAPACITANCE TRANSDUCER EMPLOYING CROSS COUPLED CONDUCTIVE PLATES TO FORM EQUIPOTENTIAL PAIRS

This is a Continuation of patent application Ser. No. 07/998,077 filed Dec. 28, 1992, now abandoned.

BACKGROUND OF THE DISCLOSURE

Capacitance transducers of varying types have been used extensively to sense motion resulting from rotation, translation, deformation, or a combination thereof. Most of the capacitance transducers which appear in the prior art, however, do not possess sufficient range, linearity, or sensitivity to be useful in a variety of engineering applications. An exception, in the case of rotation, is the linear rotary differential capacitance (LRDC) transducer described in U.S. Pat. No. 5,028,875. The present invention describes a symmetric differential capacitance (SDC) transducer for accomplishing similar objectives as the LRDC transducer, but in the realm of translation and deformation. With regard to electrical operation, the novel SDC units of this invention are similar to those of the LRDC design; with regard to mechanical configuration and application, however, the SDC units are unique and different.

The trend in capacitive transducer manufacture is toward even smaller units. When used in micro-electro-mechanical devices, transducers of the prior art (two active components) are expected to experience significant performance degradation because of extraneous stray capacitance and scaling difficulties. One means of compensating for this degradation is to use computational electronics that is external to the sensor, such as described in U.S. Pat. No. 5,028,876. A better way is to employ a transducer which automatically compensates as a natural consequence of its intrinsic properties. When operated with synchronous detection, the SDC transducer of this invention provides this automatic compensation.

As with the LRDC design, the most fundamental SDC design is one in which wires are attached to the electrodes. Because motion transducers necessarily have moving parts, and because the attachment of wire leads to the moving part of the transducer can result in undesirable damping; alternative configurations are known in which there are no wires or brushes which contact the moving member.

Differential capacitance transducers of the prior art have almost universally utilized only two active components. In response to the motion being sensed, one capacitance increases while the other capacitance decreases. Examples are found in U.S. Pat. Nos. 3,278,919; 3,729,991; 4,227,182; 4,310,806; 4,386,312 and 4,389,646 to which reference is made for further background of this invention. The pair of capacitances may be part of a bridge circuit, if desired. If this prior art transducer is part of a bridge, only two of the four components are variable, so that the circuit is referred to as a half-bridge.

With the trend toward smaller devices, and the ultimate goal of micro-sized capacitive transducers on silicon; it has been recognized that stray capacitances can be very detrimental to performance. One way to provide better immunity to these stray capacitances was noted above. Another has been indicated in U.S. Pat. No. 4,403,219, where a current coupled input is used to reduce the indicator error due to stray capacitance.

A number of previous inventions have utilized electrode geometries that are similar to the present invention. An example is U.S. Pat. No. 3,151,239. Its concern is with different objectives than the present invention, and the electronics is significantly different. Another example is U.S. Pat. No. 4,303,919 (FIGS. 1–6, where geometry selection was also motivated by different objectives than the present invention. That invention concerned with monitoring multi-component motion, not detection advantages born of symmetry.

SUMMARY OF THE INVENTION

The configurations of the present invention are concerned with unprecedented performance in the motion of a single component. This improvement in performance, as compared with the prior art, is the result of several factors that have not been previously utilized, such as, for example: (i) use of symmetric electrode arrangements, and (ii) electronics in the form of synchronous detection.

The transducer of the present invention is a bridge-type transducer wherein all four components of the transducer are active components; i.e., each one changes in response to the motion being sensed. Furthermore, because the changes maintain bridge symmetry, this full-bridge system is superior to the half-bridge prior art with regard to the stated objectives of this document. This is true with respect to range, linearity, and sensitivity. Furthermore, the sensitivity is additionally increased by the same means as that of the LRDC transducer by employing synchronous detection.

It is, therefore, an object of the present invention to provide a capacitance transducer with a high degree of sensitivity for sensing translation or deformation, such as the bowing of a membrane in one designed to sense pressure, for example.

It is a further object of this invention to provide a capacitance transducer apparatus having a translational function over a large range of motion.

A still further object of this invention is to provide a translational motion transducer in which no wire leads are connected to the moving part of the transducer, but without extreme sacrifice of range or linearity.

Another object of this invention is to provide an SDC configured transducer, without wire attachments, in which either rotational or translational motion is sensed over a larger range than is possible with prior art devices having no wire attachments.

Another object of this invention is to provide a transducer system for measuring position, and thus its changes, in a monitored condition and having a full-bridge capacitive circuit which is balanced at equilibrium and in which all four elements of the bridge vary their impedance in response to changes in the monitored condition.

Still another object of this invention is to provide a transducer system in which the elements of the transducer cause the four active capacitors to be altered in response to changes of the monitored system so as to maintain bridge symmetry; and wherein the bridge is driven by a balanced A.C. voltage source and monitored by an instrumentation amplifier coupled to a synchronous detector for providing an output D.C. voltage which is proportional to the change in the system being monitored.

These and various other objects and advantages of the invention will become readily apparent to those skilled in the art upon reading the following detailed description and claims and by referring to the accompanying drawings.

BRIEF DESCRIPTION OF THE DRAWINGS

FIGS. 8A, 8B, and 8C, respectively, are side, end and bottom schematic views, respectively, of an embodiment of a transducer of this invention having rectangular geometry;

FIGS. 9A and 9B are schematical representations of another embodiment of this invention disclosing a disassembled transducer used for sensing angular position (rotation) in accordance with the present invention;

DETAILED DESCRIPTION OF THE PREFERRED EMBODIMENT

Figure 1:
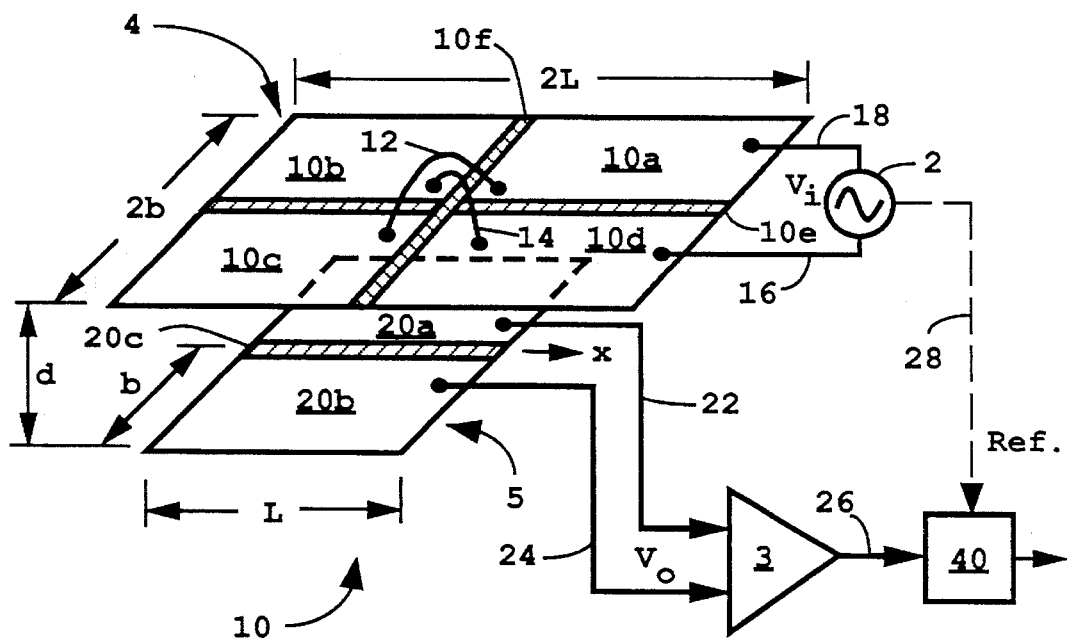
FIG. 1 is a part schematical, part diagrammatical representation of a basic transducer of the present invention as used for sensing linear position (translation)
Figure 2:
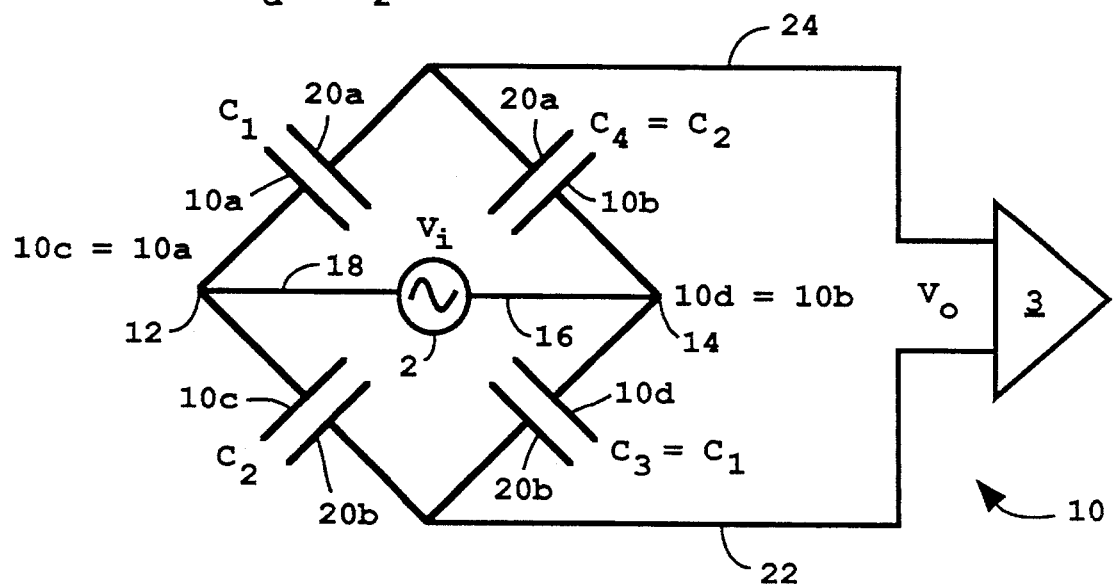
FIG. 2 is a schematic of the equivalent bridge circuit of the transducer of FIG. 1.

In the figures of the drawings, and in particular FIGS. 1 and 2, there is disclosed a basic linear position transducer 10. The transducer 10 comprises two planar electrode sets, generally indicated by the arrow at numerals 4 and 5, that are parallel and adjacent to each other with a constant separation distance therebetween, seen indicated by the letter d. As illustrated, there is a static electrode set 4 that contains four rectangular elements 10a, 10b, 10c and 10d; and a moving electrode set 5 that contains two rectangular elements 20a and 20b. All six of the elements are thin-conducting-plate rectangular electrodes and are substantially of the same size, preferably having an area bL, for example. Adjacent plates have insulator gaps formed therebetween; one gap 20c for the moving set 5, and two perpendicular gaps 10e and 10f for the static set 4. For best performance, it is preferred that the width of the insulator gaps 10e, 10f, 20c and the spacing between plate sets 4 and 5 is relatively small compared to the small dimension b of a rectangle bL, for example.

In constructing small transducers, L=b (or smaller) is acceptable; and L can be as large as is mechanically practical, when a large range of linearity (L) is desired. The four electrodes 10a–10d of the static set 4 are cross-connected electrically by any suitable means 12 and 14 to form two equipotentials; i.e., 10c has the same voltage as 10a, and 10d the same as 10b. A bridge type capacitance network results from this arrangement, and all four components of the bridge change in response to position change indicated by the arrow at x of the moving electrode set 5.

A bridge excitation source 2 applies a suitable AC voltage across the equipotential pairs of static plates; 10a, 10c and 10b, 10d; which are not electrically common, by means of conductors 16 and 18.

Conductor means 22 and 24 are connected to the pair of moving plates 20a and 20b and to a differential amplifier 3. The voltage difference between the pair of moving plates 20a and 20b is sensed by the differential amplifier 3 whose output is connected to the input of a synchronous detector 40. A representative synchronous detector of the type used in conjunction with the present invention is a model 121 manufactured by Princeton Applied Research of Princeton, N.J. The reference signal to the synchronous detector 40 is obtained from the bridge excitation source 2. As particularly seen in FIG. 1, the source of bridge excitation is applied to the plates 10a, 10d of the static set 4 and the output is detected from the plates 20a, 20b of moving set 5.

The system 10 will function; however, with the connections interchanged; i.e., drive to 5 and output from 4 and such a modification is deemed to be embraced by this invention. Additionally, the relationship of electrode sets 4 and 5 could be interchanged with respect to motion; or for that matter, both plates 4 and 5 could be moving, since only relative displacement provides an output.

The nominal zero (x=0=equilibrium) displacement position of the transducer of this invention is one in which the moving set is directly opposite the geometric center of the static set. For this position, the output from the synchronous detector is zero. Without synchronous detection, this position would be a null position, in which the slope of the output is discontinuous in going from positive x to negative x. With synchronous detection, the output of the idealized transducer is linear over all values of x in the range from −L/2 to +L/2. Idealization is an approximation in which fringe electric fields are ignored. For the conditions of small d, thin plates, and narrow insulator gaps, this is a good approximation; and the equivalent electrical circuit for the transducer is as illustrated in FIG. 2.

In FIG. 2, in response to motion, the four capacitances $C_1$, $C_2$, $C_3$, $C_4$ change in such a way as to maintain symmetry; i.e., $C_1=C_3$ and $C_2=C_4$. The output voltage from the synchronous detector is proportional to the drive voltage $V_1$ and also to $(C_1-C_2)/(C_1+C_2)=2x/L$. This form of output improves immunity to stray capacitances as an intrinsic property of the balanced bridge. Additionally, the bipolar electronics improves noise immunity through the common mode rejection ratio of the instrumentation (difference) amplifier 3. From the standpoint of noise immunity, the present embodiment of FIGS. 1 and 2 is superior to most transducers of the prior art, for another reason which will be more fully understood as this disclosure is more fully digested. Compared to methods which do not employ synchronous detection (or similar techniques based in the principles of coherence) there is a dramatic and unexpected improvement in the signal to noise ratio, and thus the sensitivity of the transducer.

In order to understand the equivalent bridge circuit for the idealized transducer of FIG. 1, it, is only necessary to recognize that the capacitance of two parallel plates, of fixed separation distance, is proportional to the area of either plate which directly faces the corresponding area of the other plate. It should be noted that some embodiments of the SDC transducer configurations herein are different from the embodiment of FIG. 1 and utilize an electrode that preferentially shields against direct electrical communication through charge induction. The idealized transducer assumes that stray capacitances, due to fringe electric fields, can be ignored. By inspection, then, one obtains the dependence of $C_1$, $C_2$, $C_3$ and $C_4$ on the position, x, as indicated in the FIG. 2. If additionally, the input impedance of the instrumentation amplifier connected to the output of the sensor is large compared to the output reactance of the bridge, the following equation applies:

$$V_o=2x\ V_i/L \qquad (1)$$

This can be realized by operating at higher frequencies of the drive oscillator, or using an instrumentation amplifier of high input impedance, or both. Typically, the drive oscillator frequency is in the neighborhood of 5 kHz to 50 kHz, and the input impedance provided by a JFET front end amplifier is in the 10's to 100's of megohms. It should be noted that Eq. 1 is true only if synchronous detection is employed. If a null detector were used, instead, then x in the equation would have to be replaced with its absolute value.

Eq. 1 has been demonstrated to describe several prototypes constructed in accordance with FIG. 1, to a degree that is adequate to most application purposes. Test results to document this claim are not provided here because the basic configuration is more useful in a pedagogical sense than in application. Prototype results of other embodiments of this invention are provided later on herein to illustrate a more useful transducer in which no wires are attached to the moving member.

Figure 3A:
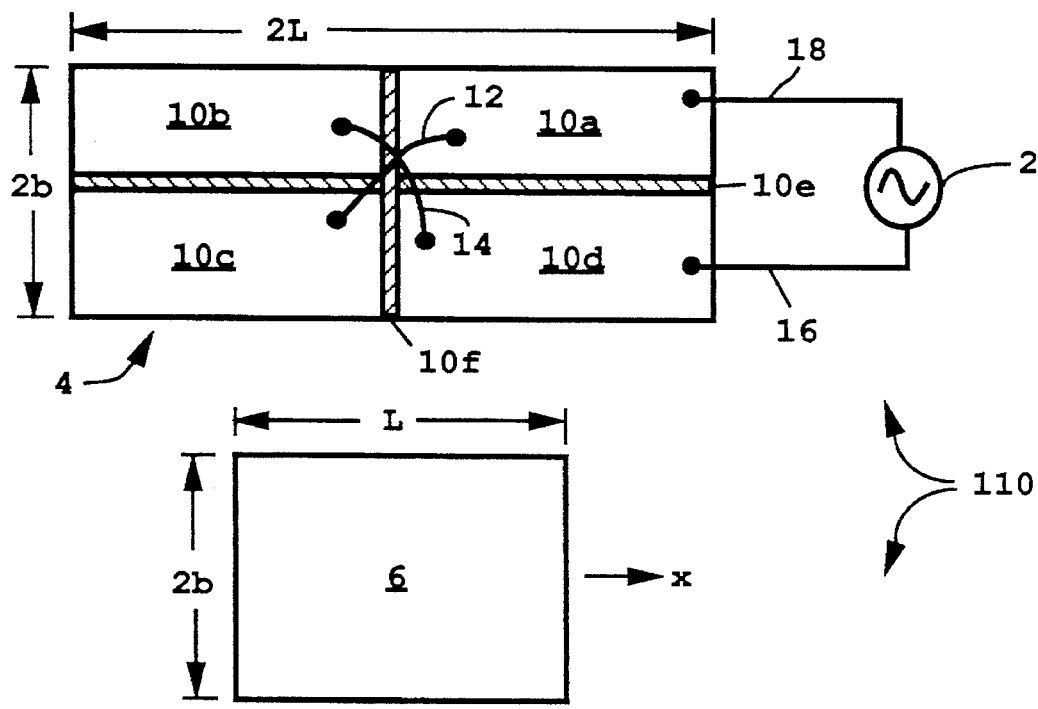
FIG. 3A is a schematical representation of a disassembled alternate embodiment of the transducer of FIG. 1 used for sensing linear position without wire attachments.
Figure 3B:
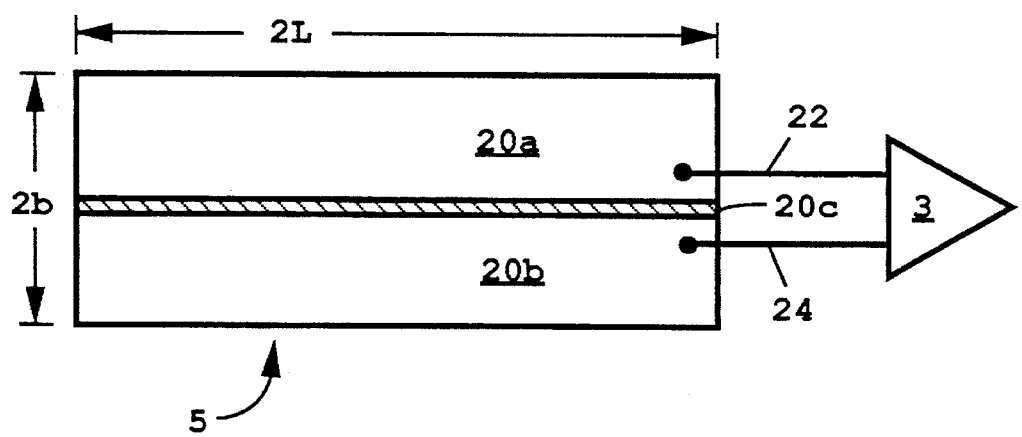
FIG. 3B is a side view that diagrammatically shows the embodiments of FIG. 3A in assembled configuration.

In most applications of the present invention, it is undesirable to have wire attachments to any moving part. A configuration 110 of the SDC transducer in which all wires have been removed from the moving member is illustrated in FIGS. 3A and 3B. The electrode goemetry for this "non-contracting linear position sensor" is planar; however, a cylindrical geometry embodiment will also be illustrated later on herein. The input and output components of the support electronics are identical to those of FIG. 1. Additionally, the static electrode set 4 is identical to that illustrated in FIG. 1. Electrode set 5, however, which is now static, has been lengthened by a factor of 2; i.e., the rectangular elements are now 2L each. The other difference, compared to FIG. 1, is the addition of the rectangular element 6, of size 2b by L. It is the only moving member of the device, and it serves to electrically shield certain areas otherwise common to electrode sets 4 and 5. If element 6 is grounded, then the shielding function is readily understood, because it is well known that charge induction is not possible through a grounded plane. The bridge equivalent circuit capacitances are determined as before, except that shielded areas do not contribute. By inspection one can write down the capacitance values according to their dependence on x, The equivalent circuit turns out to be identical to that of FIG. 2. In practice, it has been found that the moving electrode 6 does not have to be grounded. The theoretical description of the transducer is not straightforward when the electrode is floating, even though it is simple when at ground potential. Evidently, the symmetry of the transducer, derived from the bipolar drive, permits the floating arrangement to be equivalent, at least to first order. Such equivalence has been demonstrated through working prototypes, but a theoretical equivalence would probably require the solution to Laplace's equation for the system.

In FIG. 3A, plate sets 4, 5 and 6 are shown separated for clarity. In actual practice, the plate sets 4, 5, and 6 are arranged parallel to one another and separated by a constant distance d as illustrated in the side view of FIG. 3B, which shows that the plate 6 is located between plates 4 and 5, with all of the plates being superimposed on one another.

The transducer configurations illustrated in both FIGS. 1, 3A and 3B are such that a restoring force, proportional to the mean square drive voltage, acts to return the moving member 6 to x=0, which is a stable equilibrium point. Because of this, the transducer can be made to function as a low level actuator. Operation based on this novel principle makes them a translational counterpart to rotational LRDC actuators (a pertinent publication that is referenced in this document is Peters et al, "Capacitive servo-device for microrobotic applications"). The energy stored in the bridge network driven by $V_i$ is given by $E=CV_i^2/2$, where C is the net capacitance seen by the source. This value is twice the series combination of C1 and C2. The restoring force, F, is obtained by taking the derivative of E with respect to x.

$$F=2(x/L)(b/d)\epsilon_o V^2 \qquad (2)$$

where $\epsilon_o$ is the permittivity of the space between the plates indicated here by the free space value. Of course, there may be a dielectric material between the plates, which in some cases would be advantageous.

Figure 4A:
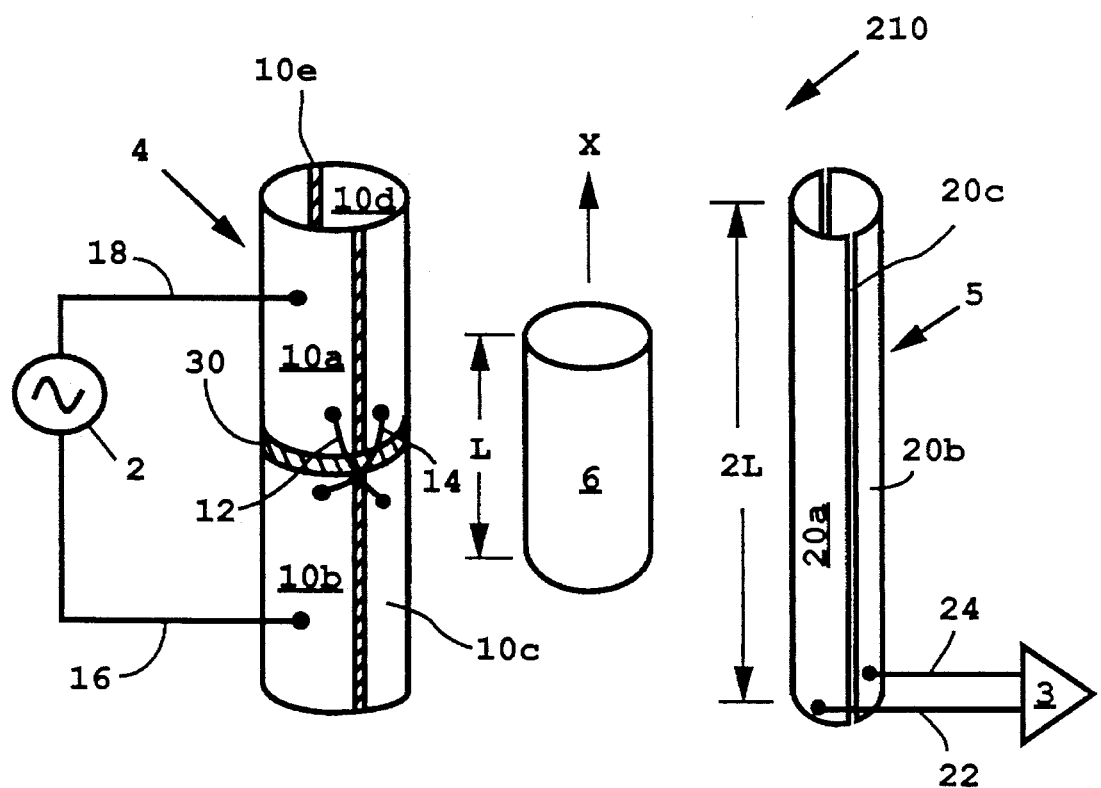
FIG. 4A sets forth a disassembled schematic view of another alternate embodiment of the transducer of FIG. 1 and showing a cylindrical geometry form that is used for sensing linear position without wire attachments, constructed in accordance with the present invention.
Figure 4B:
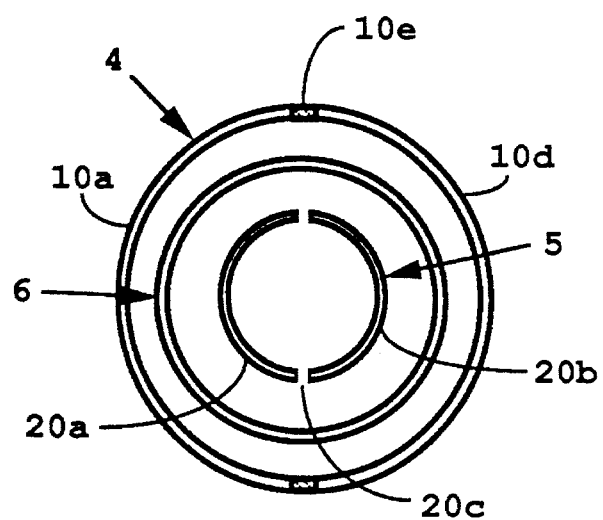
FIG. 4B is a top plan view that diagrammatically shows the embodiment of FIG 4A in assembled configuration.

In the embodiment of FIGS. 4A and 4B there is illustrated an SDC transducer 210 configured to serve as a noncontacting linear position sensor possessing cylindrical geometry. Plate sets 4, 5, and 6 are shown separated for clarity. In actual practice the plate sets are arranged concentrically as disclosed in FIG. 4B with the plate 6 being located between the plate sets 4 and 5 in axially aligned relationship respective to one another. This disposes the plate sets such that plate 5 is the innermost plate and plate 4 the outermost plate. The system will function, however, with 4 as innermost and 5 as outermost; and such a modification is deemed to be embraced by this invention.

This configuration of the invention can be seen to be a symmetric bridge through topological considerations. It is obtained from FIG. 3A by altering the infinite radius of curvature (flat) plates of the earlier case to finite values in the parts corresponding to the shorter dimension (2b) of the device. As shown in FIG. 4A, the shorter dimension has been selected, for the amount of curvature, to accomplish closure. It is possible, however, for the electrodes to be partial, rather than full cylinders. The full-cylinder form of the SDC transducer is especially compatible with some applications. It can serve, for example, as a replacement for linear variable differential transformers (LVDT's). It has advantages over the LVDT because it is much easier, for example, to make very small units. Additionally, it is a fundamentally cheaper device to manufacture than the LVDT, with expected comparable or even superior performance.

The equivalent circuit component values are not provided for the transducer 210 of FIGS. 4A and B. They are more complicated than those of the earlier figures (involving logarithms), and in application, one does not need to know them. It is sufficient to recognize, both from earlier arguments, and the performance results from prototypes, that this cylindrical geometry is once again an SDC type. Thus the output voltage is again of the form $(C_1-C_2)/(C_1+C_2)$, if the spacing between electrodes is smaller than the radius of the innermost electrode set, the same is true of the largest gap spacing, and if $C_1=C_3$ and $C_2=C_4$. Actually, the indicated equalities do not have to be satisfied for satisfactory operation. They represent an optimum case.

Not only is the transducer 210 of FIGS. 4A and 4B attractive in terms of better mechanical compatibility for some applications, it also has unexpected advantages derived from a shielding standpoint. If the output is taken from the center cylinder electrodes 6, then the outermost (quadrant elements) drive set 4 serves as a natural (surrounding) shield against noises that couple to the output through stray capacitance and/or inductance. Of course, the device could be operated with the input/output functions reversed, but then this novel shielding advantage would be lost.

Figure 5:
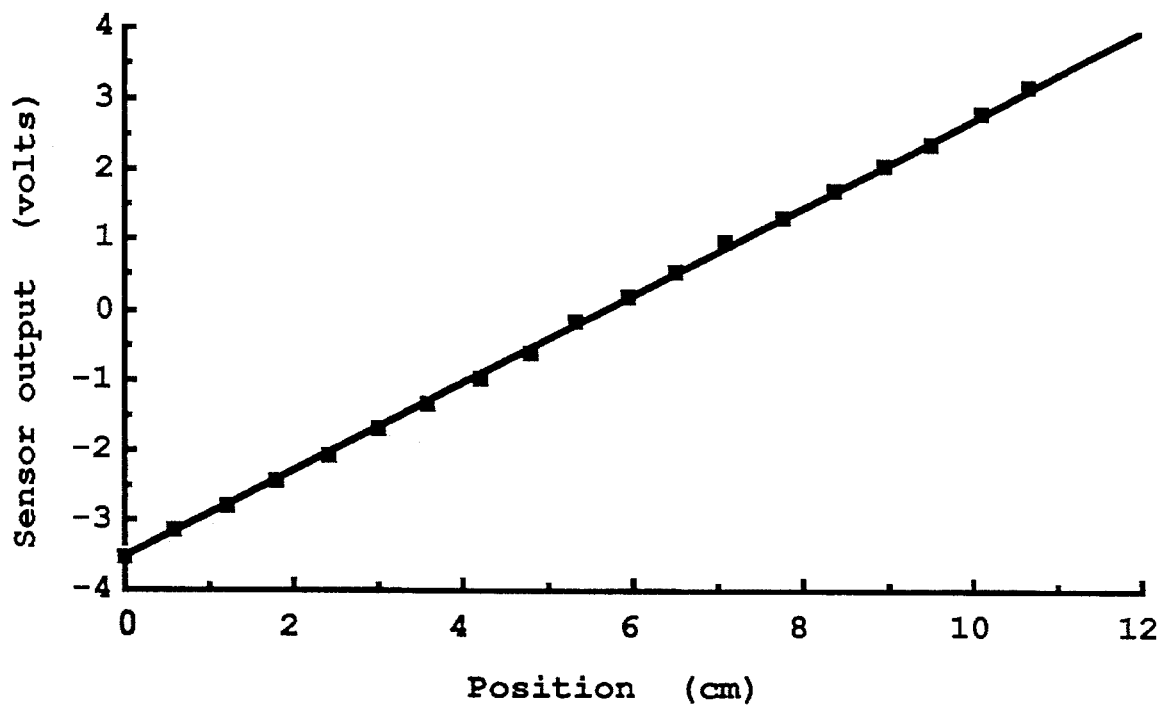
FIG. 5 is a plot that shows the results of a test conducted with a prototype transducer for measuring linear position, constructed in accordance with the present invention.

In FIG. 5 are test results from an SDC transducer 210 configured according to FIG. 4A. The prototype for these tests was a very crudely constructed unit, in which no effort was made to produce insulating gaps 10e and 20c with smooth, straight edges. In spite of this crudeness, the unit performed very well. From the FIG. 5, it can be determined that the linearity is better than 1% over a range in excess of eight centimeters. At higher gain of the electronics, the sensitivity of the transducer was found to be quite large at 80 V/cm, even though the electronics was an inexpensive home-built unit fabricated from only two integrated circuits (Signetics NE5521N and an LF347 opamp). The resolution of this device was found to be about $5\times10^{-7}$ m. Undoubtedly, it would be at least ten times greater if the transducer were supported with sophisticated electronics.

Figure 6A:
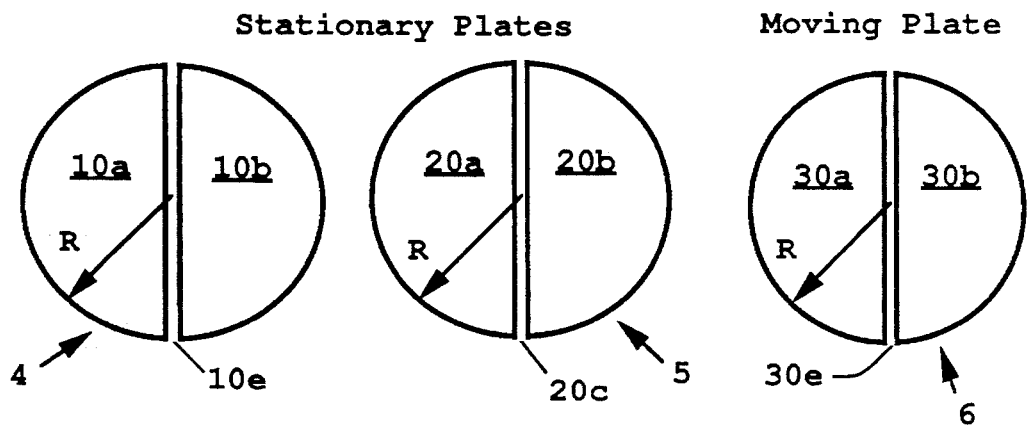
FIGS. 6A sets forth a schematic of a dissembled alternate embodiment of the transducer of FIG. 1 made in accordance with the present invention.
Figure 6B:
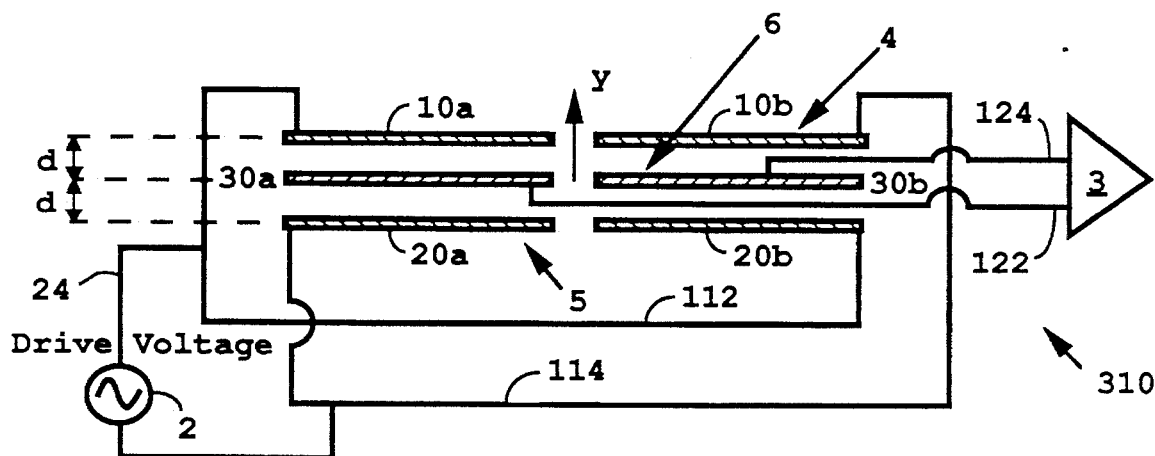
FIG. 6B is a side view that diagrammatically shows the embodiment of FIG. 6A in assembled configuration.

In the embodiment of FIGS. 6A and 6B there is illustrated a configuration 310 of the SDC transducer which can be used for measuring either small position changes or deformations. It could be important (in an equivalent rectangular form) to micro-electro-mechanical systems involving monolithic silicon structures. Of the three parallel, planar electrode sets 4, 5, and 6; only the inner one 6 moves. As shown, electrode set 6 moves so as to maintain its planar shape. In a pressure sensor, as an example of deformation, electrode set 6 might not maintain its planar shape. Rather, it could experience differing degrees of distortion (bowing) under the influence of a pressure differential across its opposite faces. For example, a gas pressure prototype sensor has used this configuration, in which electrode set 6 was fabricated from aluminized mylar, with an insulator gap 30e in the evaporated aluminum. In this case, only the central region of electrode set 6 experiences deflection, since the circumference is fixed. Of course, the membrane of 6 could be made larger than the other electrodes, so that planar motion is more nearly realized.

In the transducer configuration of FIGS. 6A and B, the dissembled view of FIG. 6A shows the plates separated for clarity, with plate 6 being located between plates 4 and 5, which are parallel and separated by a constant distance, 2d. The insulator gaps 10e, 20c and 30e are all arranged parallel respective to one another. As with other SDC transducer designs of this invention, there is a cross-connection of the static electrodes. Thus electrodes 10a and 20b are equipotentials; and likewise for electrodes 10b and 20a. As in previous examples, a bipolar input voltage drive oscillator 2 is applied across the non-common elements of electrodes 4 and 5, and an instrumentation amplifier 3 is connected to the output at electrodes 30a and 30b. Also, as in the before illustrated examples, the conditions $C_3=C_1$ and $C_4=C_2$ are maintained as electrode 6 moves. Unlike the basic configuration illustrated in FIG. 1, which responds by way of area changes, the transducer shown in FIGS. 6A and B depends, for its operation, on changes in gap spacing. Letting the equilibrium gap spacing of both 4/6 and 5/6 be d and the vertical position of the moving electrode be designated by y, it is seen that the gap spacing between 6 and 4 is d−y, and between 6 and 5 is d+y.

The nominal zero displacement position (y=0) for this transducer is one in which electrode 6 is midway between the two stationary electrode sets. For this position, the output voltage is zero. As before, the output voltage from the transducer is proportional to the magnitude of the drive voltage and also to $(C_1-C_2)/(C_1+C_2)$, when synchronous detection is employed. Over the range from y>−d to y<+d, reasonable linearity results if the electrodes of 6 are thin, the planar shape is maintained, and R>>d.

The equivalent circuit of the transducer in FIG. 6B is a symmetric bridge, as before. It is identical with FIG. 2, except that $C_1$, $C_2$, $C_3$, and $C_4$ now assume the following values for the idealized unit:

$$C_1 = \frac{\epsilon_o \pi R^2}{2}\left(\frac{1}{d-y}\right)$$

$$C_2 = \frac{\epsilon_o \pi R^2}{2}\left(\frac{1}{d+y}\right)$$

$$C_3 = C_1 \text{ and } C_4 = C_2$$

To understand the indicated values of capacitance, it is only necessary to recognize that the capacitance between parallel conducting plates of fixed common-area is inversely proportional to the separation distance between the plates, in the absence of fringe fields. Substituting these values into $(C_1-C_2)/(C_1+C_2)$ yields the output for this transducer.

$$V_o = y \, V_i/d \qquad (3)$$

Figure 7:
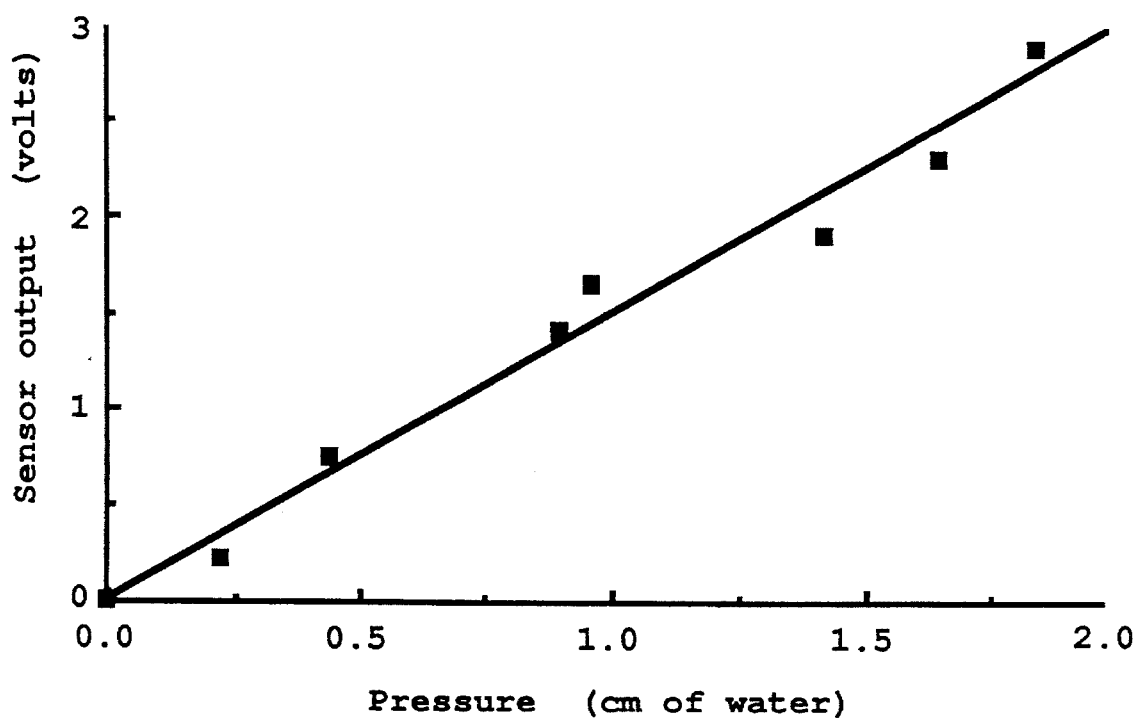
FIG. 7 is a plot showing the results of a test conducted with a prototype transducer for measuring deformation (and thus pressure), constructed in accordance with the present invention.

Example performance results for a prototype built in accord with FIGS. 6A and B are provided in FIG. 7. This data was obtained using a crudely constructed unit, concerned primarily with detectability limits, and not range or linearity. Large scatter is present primarily because of poor mechanical integrity in the U-tube manometer used for pressure calibration. The working fluid for the manometer was denatured alcohol (specific gravity 0.7), which communicated with the sensor membrane 6 through an air column (small bore tygon tubing). The sensor membrane was fabricated from a 2 inch diameter section of 400 micro-inch thick aluminized mylar. By means of this and other tests of the prototype, the expected behavior of this configuration of the SDC transducer has been confirmed. By operating at higher gains of the electronics than was true for the data of FIG. 7, it has been shown that pressure sensors based on the present design are capable of greater sensitivity than ones based on prior art. For example, the same prototype which produced FIG. 7 can measure pressure changes smaller than $10^{-6}$ pounds/in$^2$ with unsophisticated electronics support.

The transducer 410 illustrated in FIGS. 8A, 8B, and 8C utilizes rectangular plates for purposes of illustration. In FIG. 8B, plate 20b is connected to plate 10a and the plate 20a is connected to plate 10b (not shown). The A.C. drive is applied across the resulting pair of equipotentials. Member 6 moves as a cantilever. The insulator gaps 20e of this device could be oriented transverse to the cantilever and centered (90 degrees to the direction shown) and the device would still function. Such a modification is deemed to be embraced by this invention.

The transducer 310 illustrated in FIGS. 6A and 6B utilizes circular plates; however, these plates can be replaced with rectangular ones, which are better suited to some techniques of fabrication. For example, the device of FIGS. 8A, 8B, and 8C could be fabricated on a monolithic structure of silicon by selective doping/etching, and also by other processes known to those skilled in the art to form the entire electrode set plus associated cantilever, which constitutes the moving member. Connections, such as the ones shown in FIGS. 8A, 8B, and 8C to the instrumentation amplifier 3, would be made through the bulk (insulator material) of the structure (shown shaded).

One example of transducer applications based on the configurations of FIGS. 6 and 8 is the previously mentioned pressure transducer using measured deformation of a membrane. Additionally, such transducers can be made to function as a strain gauge, wherein the transducer is a capacitive counterpart to the full-bridge resistive strain gauge. Ideally, the strain is applied in such a way as to maintain full symmetry as the central electrode set is either deformed or displaced. Even if the symmetry should be disrupted during strain, however, the unit still function with reduced sensitivity.

There are numerous other application possibilities, such as altimeters, airspeed indicators, accelerometers, and seismic units, for example only. The mass of the cantilever in FIG. 8 enables the unit to function as an accelerometer. For the proper direction of an externally applied force, cantilever inertia cause bending, which is in turn sensed by the transducer. Because of the properties of bending beams, this will have nonlinearities at higher accelerations; nevertheless, this device could be the basis for a very sensitive and very reliable accelerometer. By producing very small structures, it could also be designed to measure extremely large accelerations.

FIG. 9 illustrates an SDC transducer 610 which is configured to measure angles. Plate sets 4, 5 and 6 are shown separated for clarity. In actual practice, the plate sets 4, 5 and 6 are superimposed and arranged parallel to one another and separated by a constant distance. Rotatable plate 6 is located between stationary plates 4 and 5. The embodiment 610 of the invention is non-contacting (no wire attachments), and as with the transducer of FIG. 4, it can be seen to be a symmetric bridge through topological considerations. Closure is effected by altering the infinite radius of curvature (straight) edges of the embodiment of FIG. 3 to finite values and thus form circles and semi-circles. Unlike the cylinder result of FIG. 4, the embodiment of FIG. 9A yields flat circular plates. FIG. 9A illustrates the case of complete closure; however, the device can be made to work with partial circular arcs rather than full circles. Indicated in the figure are positions of the rotor for equilibrium (zero output from the electronics), along with the maximum positive and negative cases (±90 degrees rotation away from equilibrium). As in previous configurations, plate electrodes 10c and 10a are connected (not shown), as are 10d and 10b (not shown). The A.C. drive signal is applied across the non-common electrodes of 4 (not shown). As with the LRDC transducer, this device has an electrostatic restoring torque, permitting it to function as an actuator. Its output voltage as a function of angle is the same, to first order, as that of the LRDC basic device.

The SDC angle position sensor of FIG. 9A has advantages over the LRDC transducer in some applications. For example, it has twice the range of the "alternate configuration" shown in U.S. Pat. No. 5,028,875, FIG. 6 thereof. It has the additional advantage that the moving (rotating) member can be a grounded conductive electrode. Highly doped silicon has been found to work as well or better than metallic electrodes in this capacity.

Figure 10A:
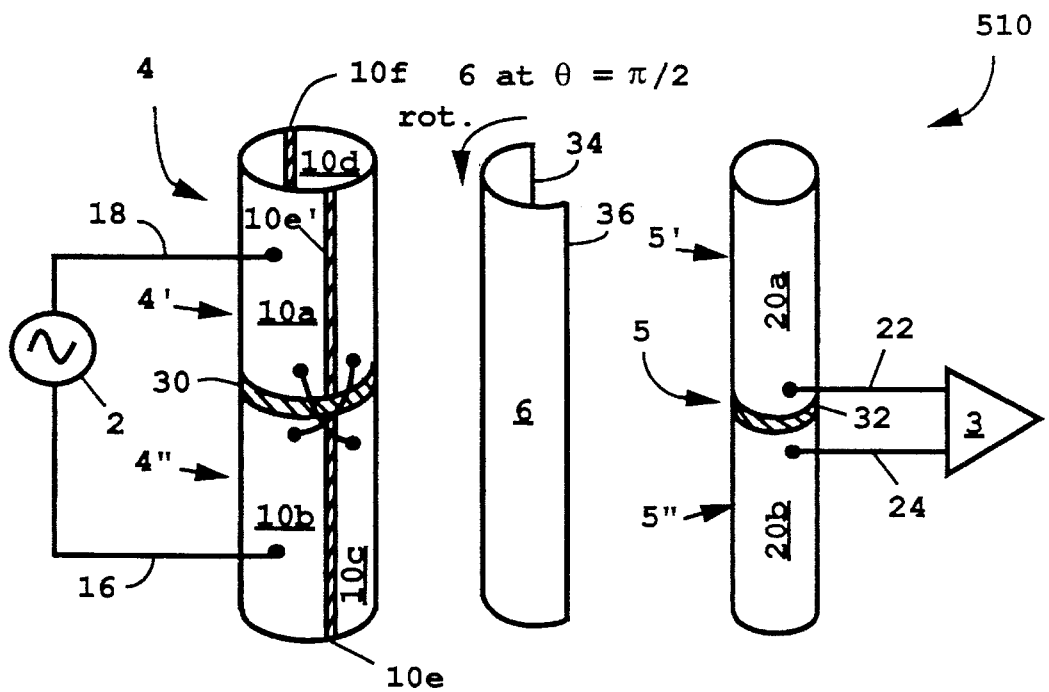
FIG. 10A is a disassembled schematical view of a cylindrical geometry transducer as used for sensing angular position in accordance with the present invention.
Figure 10B:
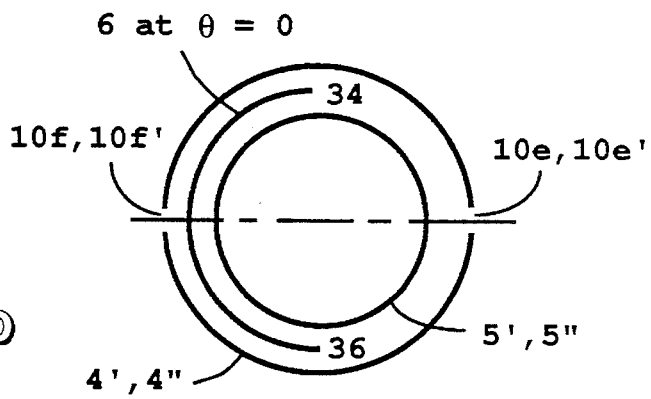
FIG. 10B is a top view diagrammatically illustrating the transducer of FIG. 10A in assembled configuration.

Other geometries are also possible for the SDC angular position transducer. Illustrated in FIG. 10 is an example of an embodiment 510 having cylindrical geometry. In FIG. 10A plate sets 4, 5 and 6 are shown separated for clarity. In actual practice, the plate sets 4, 5 and 6 are arranged to form a concentric set as illustrated in the top view of FIG. 10B, which shows that the plate 6 is located between plates 4 and 5. As with two previous SDC transducer configurations, this transducer can be recognized as a topological variant of FIG. 3. The member 6 is a unitary, semi-cylinder which is axially aligned with and rotates between 4 and 5 with a range in θ between ±90 degrees for linear output. The axial insulator gaps 10e, 10f seen in 4, are separated from each other by 180 degrees. Numeral 30 indicates the space between upper and lower members 4' and 4". In FIG. 10A, electrode 6 is shown at maximum positive rotation, (90 degrees=π/2, in FIG. 10B at zero rotation (equilibrium). This configuration of angular position transducer has advantages over the flat plate unit of FIG. 9 in some applications. For example, if one wants to measure the position of an axle that transmits large torques, FIG. 10 would be the better choice in cases where space is limited.

Figure 11:
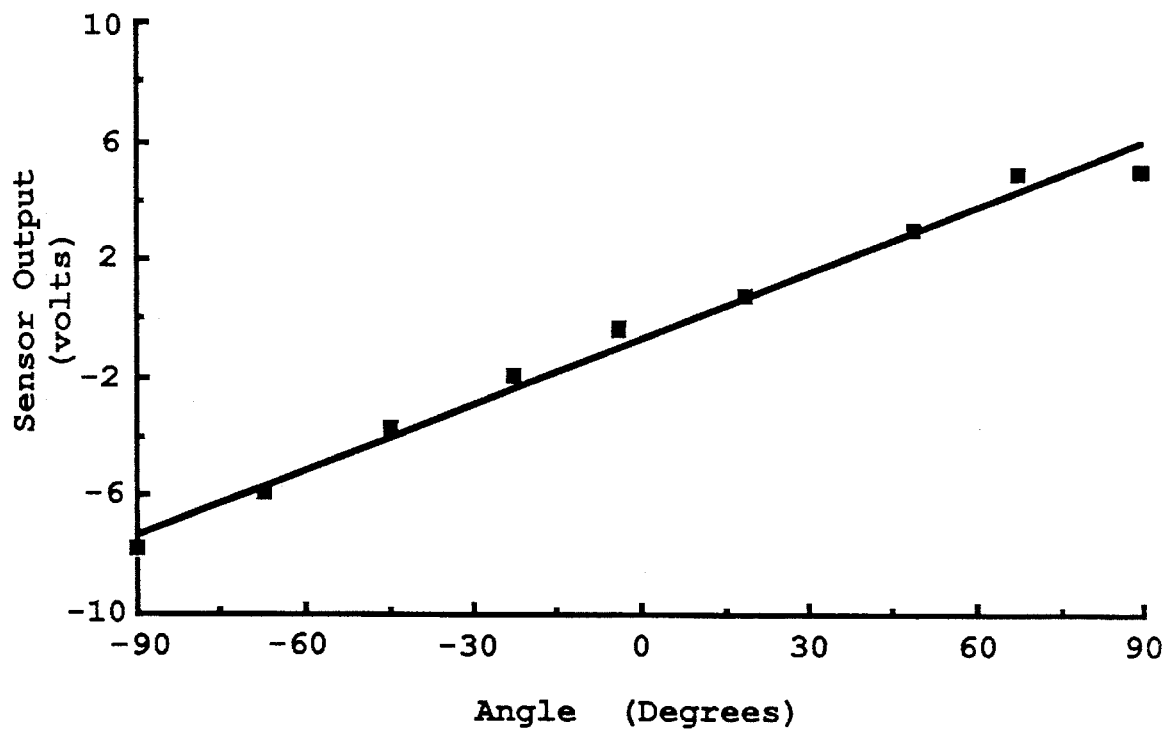
FIG. 11 is a plot showing the results of a test conducted with a prototype transducer for measuring angular position, constructed in accordance with the present invention.

Performance results from a crude prototype constructed in accord with FIG. 9 are provided in FIG. 11. Reasonable linearity is seen to hold over a range of 180 degrees. Angular resolution in this range was found to be about twenty arc-seconds, by switching to higher electronics gain than was used in collecting the data of FIG. 11.

Figure 12:
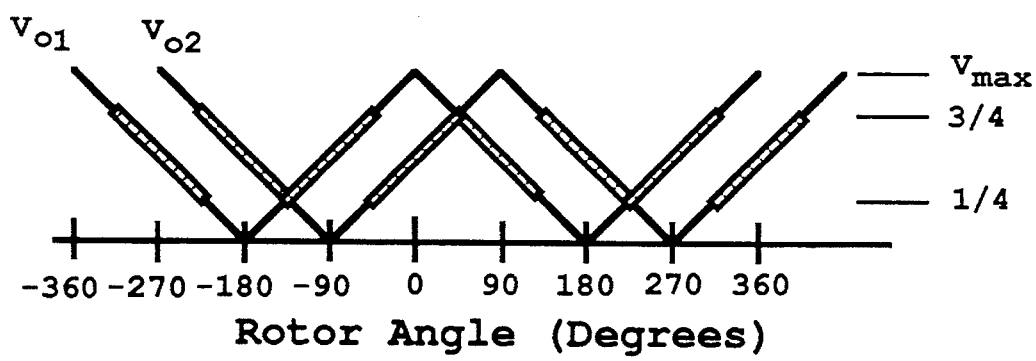
FIG. 12 is a plot diagrammatically illustrates the quadrature response of two SDC angle position sensors of the invention for measuring angles over an infinite range.

The SDC angular position transducer can be used to measure angle over an infinite range by ganging two of the units in quadrature on a common axle. The "quadrature" arrangement is one in which the principal axes of the static electrodes of the two transducers are at right angles to each other. Thus, the outputs from the pair (requiring two separate electronics support units) are 90 degrees out of phase with each other, as illustrated in FIG. 12. Both transducers are monitored (sequentially) with a computer using an Analog to Digital converter. Either $V_{01}$ or $V_{02}$ is selected, by an algorithm that insures safe avoidance of angle regions where the slope changes sign. For switching in accord with FIG. 12, an offset is provided to the transducer outputs, so that the signals are always positive. Switching between $V_{01}$ and $V_{02}$ is made to occur only for output values corresponding to ¼ and ¾ the maximum (matched) output value. Thus, the operational regions of the composite set corresponds to the shaded regions of the curves of FIG. 12.

Figure 13:
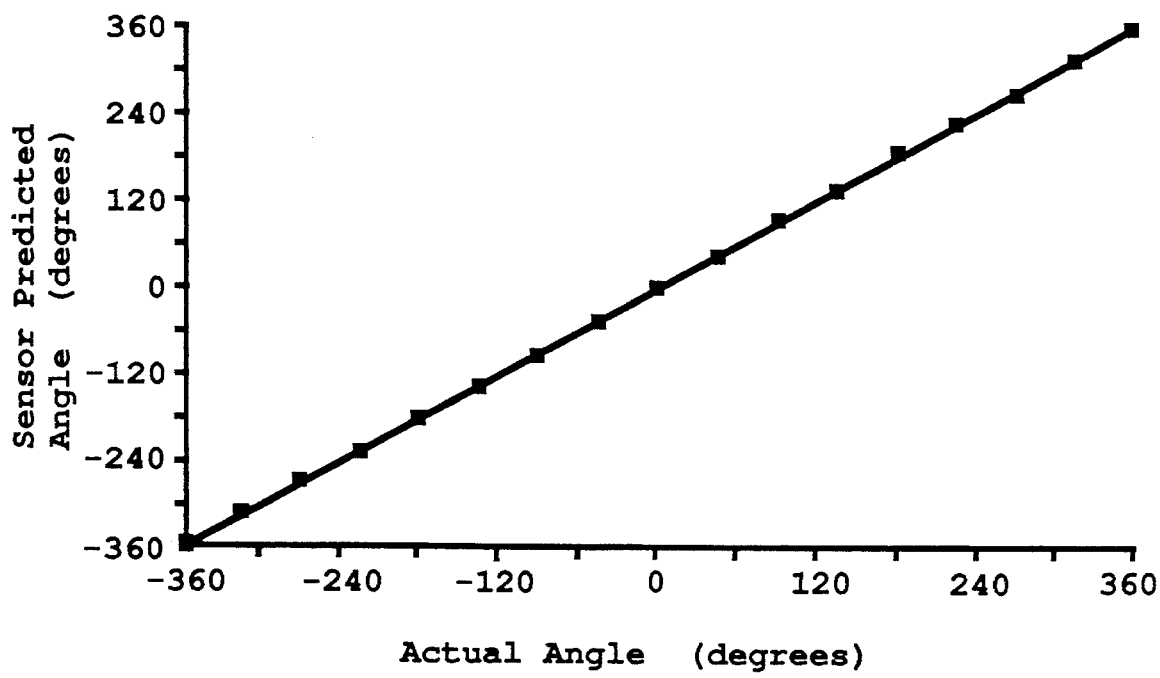
FIG. 13 is a plot that illustrates the results of a test conducted with a prototype transducer having infinite angular range in accordance with the present invention; and, FIGS. 14A, 14B and 14C respectively set forth another embodiment of the invention, respectively, of the side, end, and top views of a spherical geometry transducer used for sensing angular position.

To test these concepts, a prototype was constructed. For the necessary switching, an algorithm was written in QUICKBASIC for use on INTEL386/486 IBM compatible personal computers. Analog to digital conversion was provided by a METRABYTE 1401. In FIG. 13 are performance results taken with this prototype over a 720 degree range. Linearity is seen to be reasonably good, even from crude units constructed with copper-clad printed circuit boards.

Figure 14A:
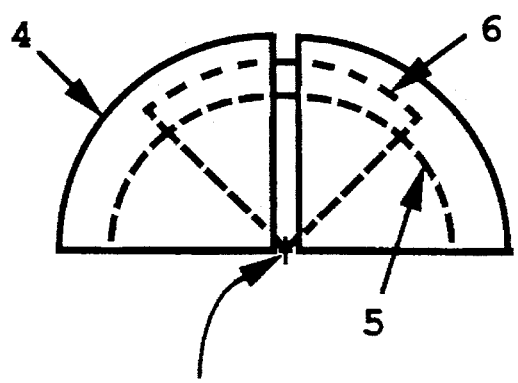
Figure 14B:
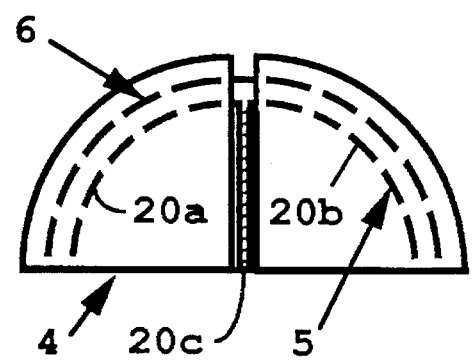
Figure 14C:
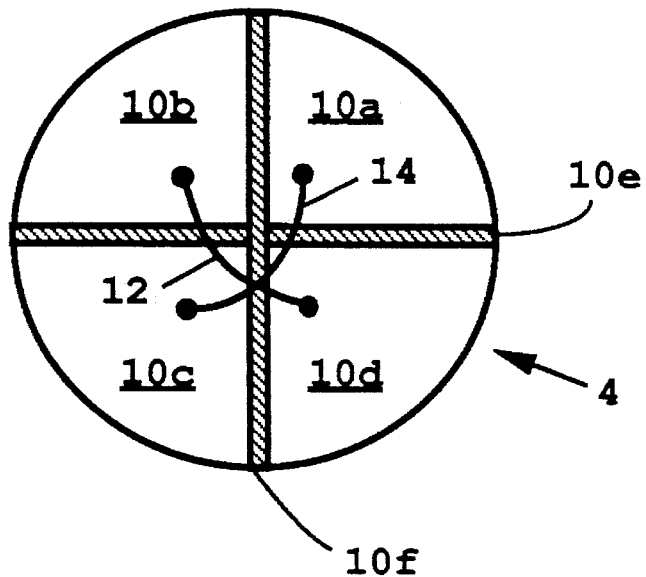

FIGS. 14A, 14B and 14C are yet another geometry (spherical) for sensing angular motion. As shown, elements 4 and 5 are hemispherical shells and element 6 is one-forth of a spherical shell. It is possible for them to be whole spheres or portions of spheres, or ellipsoids for that matter, and the device would still function. All such cases are deemed to be embraced by this invention. It can be seen that these are topological variants of FIG. 3. As with other SDC transducers of this invention, there is a cross connection of elements of 4, thus 10a and 10c are equipotentials, as are 10b and 10d. The A.C. drive is applied at 12 and 14, and connection to the instrumentation amplifier is at 20a and 20b of elements 5. Insulator gaps 10e and 10f, in the form of circles, are found to intersect perpendicularly at the top of 4. There is another circular insulation gap 20c which divides 5 into the electrodes 20a and 20b. Element 6 rotates between elements 4 and 5 about the axis which is shown perpendicular to the page.

I claim:

1. A symmetric differential capacitance transducer, comprising:

a first electrode set comprising at least four separated conductive plates, two of each of said conductive plates electrically coupled together to form two equipotential pairs;

a second electrode set comprising two separated conductive plates, whereby four capacitances are formed between the two equipotential pairs and the two conductive plates of the second electrode set such that a full bridge electrical circuit is formed wherein all four capacitances change in symmetric fashion;

means for altering the four capacitances in response to a variable condition;

a voltage excitation source for supplying an AC input voltage;

a differential amplifier with two inputs and an output, for measuring the potential difference between the two inputs; and, a synchronous detector coupled to the output of the differential amplifier.

2. The symmetric differential capacitance transducer of claim 1, wherein:

the first electrode set comprises a static structure wherein the four conductive plates are placed together and are separated by intersecting insulative strips;

the second electrode set comprises a static structure wherein the two conductive plates are separated by an insulative strip;

the input voltage is supplied across the two equipotential pairs of the first electrode set;

the differential amplifier inputs are coupled to the conductive electrode plates of the second electrode set; and, the means for altering the four capacitances comprises a movable plate located between the first and second electrode sets.

3. The symmetric differential capacitance transducer of claim 2, wherein:

the first electrode set, second electrode set and movable plate are of planar geometry and the variable condition is linear position.

4. The symmetric differential capacitance transducer of claim 2, wherein:

the first electrode set, second electrode set and movable plate are of cylindrical geometry and the variable condition is linear position.

5. The symmetric differential capacitance transducer of claim 2, wherein:

the first electrode set, second electrode set and movable plate are of planar geometry and the variable condition is angular position.

6. The symmetric differential capacitance transducer of claim 2, wherein:

the first electrode set, second electrode set and movable plate are of spherical geometry.

7. The symmetric differential capacitance transducer of claim 1, wherein:

the first electrode set comprises two separate static structures, each of said separate static structures including two conductive plates separated by insulative strips, wherein the two equipotential pairs are formed by cross coupling conductive plates on the separate static structures;

the second electrode set is positioned between the two separate static structures and includes an insulative strip between its two conductive plates;

the input voltage is supplied across the two equipotential pairs of the first electrode set;

the differential amplifier inputs are coupled to the conductive electrode plates of the second electrode set; and, the means for altering the four capacitances comprises a movable member located between the two separate static structures.

8. The symmetric differential capacitance transducer of claim 7, wherein:

the movable member is the second electrode set.

9. The symmetric differential capacitance transducer of claim 8, wherein:

the movable member is a cantilever.

10. The symmetric differential capacitance transducer of claim 8, wherein:

the movable member is a diaphragm.

11. The symmetric differential capacitance transducer of claim 8, wherein:

the variable condition is pressure.

12. The symmetric differential capacitance transducer of claim 8, wherein:

the variable condition is deformation.

* * * * *